United States Patent [19]

Applewhite

[11] 3,841,413

[45] Oct. 15, 1974

[54] TRACTOR ATTACHMENT BAR ASSEMBLY WITH RETRACTABLE PORTIONS

[76] Inventor: William M. Applewhite, Route 2, Batesville, Miss.

[22] Filed: May 25, 1973

[21] Appl. No.: 363,955

[52] U.S. Cl.................. 172/311, 172/458, 172/476
[51] Int. Cl............................................ A01b 63/00
[58] Field of Search ........... 172/446, 448, 451, 456, 172/476, 491, 458, 483, 311, 324, 326, 673, 679, 680, 675, 605, 667, 741, 776

[56] References Cited
UNITED STATES PATENTS

| | | |
|---|---|---|
| 2,187,380 | 1/1940 | Kaltopt........................... 172/458 X |
| 3,242,995 | 3/1966 | Keusder.......................... 172/476 X |
| 3,616,863 | 11/1971 | Karpovich et al. ............. 172/458 X |

*Primary Examiner*—Stephen C. Pelligrino
*Attorney, Agent, or Firm*—Berman, Bishoff & Platt

[57] ABSTRACT

A tractor attachment consisting of a main transverse supporting bar carrying depending plows for planter elements, or the like, and being provided with extensible and retractile auxiliary supporting bar segments carrying similar equipment. The auxiliary bar segments can be elevated and retracted to positions overlying the main supporting bar so as to at times reduce the width of the attachment, so as to allow turning at the end of rows, crossing narrow bridges, passing through narrow gates or openings, or the like.

10 Claims, 7 Drawing Figures

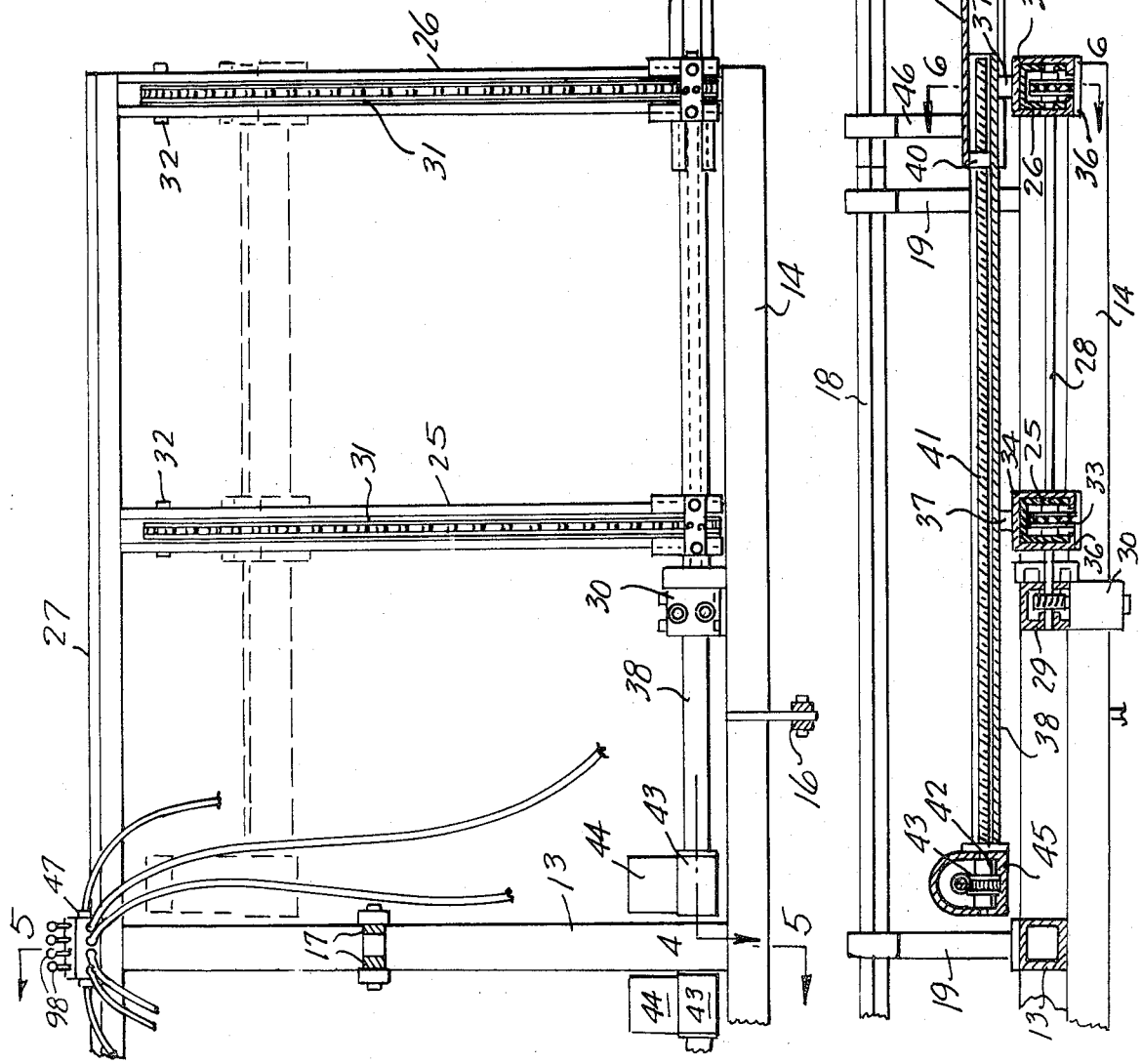

TRACTOR ATTACHMENT BAR ASSEMBLY WITH RETRACTABLE PORTIONS

This invention relates to tractor attachments, and more particularly to a tractor attachment for carrying a plurality of agricultural tools such as plows, planter devices, or the like, for simultaneously working a plurality of rows, with means provided for at times reducing the width of the attachment to facilitate turning or maneuvering of the tractor and attachment.

A main object of the invention is to provide a novel and improved multiple tool-carrying tractor attachment having retractable portions for at times reducing the width of the attachment, the attachment being of relatively simple construction, being easy to operate, and which includes means for at times retracting portions of the attachment to reduce the width thereof so as to permit turning at the end of rows, crossing narrow bridges having limited width, passing through narrow gates and openings, or similar conditions where the tractor and attachment cannot pass when in normally operative condition.

A further object of the invention is to provide an improved hydraulically operated tractor attachment adapted to carry a plurality of agricultural tools, such as plows, planter devices, or the like, for simultaneously working a substantial number of rows, the attachment being provided with hydraulically operated means for at times retracting the outer portions of the attachment so as to greatly reduce its width and to facilitate turning at the ends of rows or making other sharp turns, and to enable the tractor and attachment to pass through relatively restricted gates or openings, the attachment involving relatively inexpensive components, being durable in construction, being reliable in operation for retracting and extending its movable parts, and being provided with means for performing the required extension or retraction of its movable parts by an operator positioned in the operator's seat of the associated tractor.

A still further object of the invention is to provide an improved multiple tool-carrying tractor attachment having means for retracting its end portions at times so as to reduce the width of the attachment, the attachment including means for elevating the outer portions of its tool-supporting assembly and for then retracting said outer portions inwardly so that the tools carried by said outer portions overlie the tools carried by the inner portions of the attachment, whereby to greatly reduce the width of said attachment and permit easy maneuvering of the associated tractor with the attachment connected thereto, as required, and to facilitate the passage of the tractor and attachment through relatively narrow openings or gates, the various movable parts of the attachment being hydraulically operated and control means being provided for such operation, the control means being relatively accessible to the operator of the associated tractor and allowing him to actuate said control means from his normal working position, the attachment being adaptable for use with various types of agricultural tools such as planters, cultivators, bedders, or the like, wherein a substantial number of rows are simultaneously worked.

Further objects and advantages of the invention will become apparent from the following description and claims, and from the accompanying drawings, wherein:

FIG. 3 is an enlarged vertical cross-sectional view taken substantially on the line 3—3 of FIG. 1.

FIG. 4 is a horizontal cross-sectional view taken substantially on the line 4—4 of FIG. 3.

Figure 1:
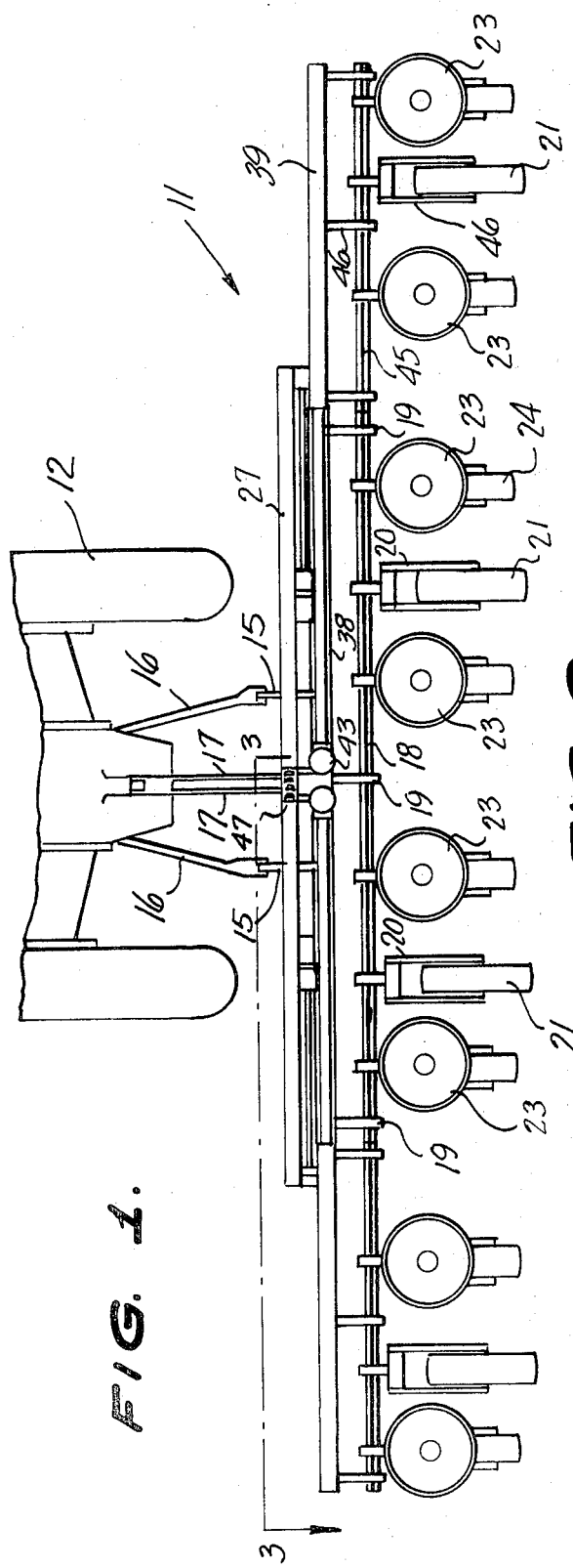
FIG. 1 is a top plan view showing a typical tool-carrying attachment according to the present invention and showing the rear portion of a tractor to which the attachment is connected, the attachment being shown as carrying eight planters, the parts being arranged in operating positions for simultaneously planting eight rows.

Referring to the drawings, 11 designates a typical embodiment of an improved multiple tool-carrying tractor attachment according to the present invention, the attachment being shown connected to a conventional tractor 12 of the type provided with hydraulic power take-off means, such as hydraulic pump means having an outlet conveniently available for connecting hydraulically driven apparatus thereto, as desired.

It will also be understood that the conventional hydraulic power take-off means is provided with a return conduit leading to the hydraulic fluid reservoir associated with the hydraulic power take-off means.

The tractor attachment 11 comprises a main transverse frame bar 14 having a pair of forwardly extending arms 15,15 rigidly connected thereto at its intermediate portion, the arms 15,15 being adapted to be connected to the tractor drawbar members 16,16 as shown in FIG. 1. An upstanding arcuately curved post member 13 is rigidly secured to the midportion of the transverse bar member 14, the intermediate portion of the upstanding post member 13 being likewise connected to the tractor 12 by hitch bar members 17,17, as shown in FIGS. 1 and 3.

Designated at 18 is a main transversely extending tool bar which is rigidly secured to bar member 14 by a plurality of supporting arms 19. Respective caster assemblies 20,20 are pivotally connected to the tool bar 18, said caster assemblies including the ground-engaging supporting wheels 21,21. Secured on the transversely extending horizontal tool bar 18 are a plurality of conventional planter assemblies 23, for example, four planter assemblies, two of said assemblies being located between the caster assemblies 20,20 and the remaining two being located outside of said caster assemblies, as shown in FIG. 1. The planter assemblies 23 are of conventional construction and may be of the type having ground-engaging actuating members 24. The members 24 may comprise wheel elements whose rotation operates the associated planter assemblies, causing distribution of seed or other material from said assemblies.

Rigidly secured to the main supporting transversely extending bar member 14 parallel to and spaced symmetrically on opposite sides of the center upstanding arcuate post member 13 are pairs of spaced upstanding arcuate auxiliary post members 25,26 of generally C-shaped rectangular cross-section. The top ends of the upstanding members 13, 25 and 26 are rigidly connected by a transversely extending horizontal bar member 27. Journaled in the lower portions of the members 25,26 at opposite sides of the central post member 13 are respective transversely extending drive shafts 28 whose inner ends are connected through suitable reduction gearing assemblies 29 to hydraulic motors 30 mounted on the main supporting bar member 14. Respective sprocket chains 31,31 are provided inside the post members 25,26, the top portions of the endless sprocket chains being supported on sprocket wheels carried on idler shafts 32,32 provided in the top ends of the pairs of post members 25,26. The lower ends of the endless sprocket chains 31 extend around and are drivingly engaged by sprocket wheels 33 mounted on the drive shafts 28 in the lower end portions of the post members 25,26.

Figure 6:
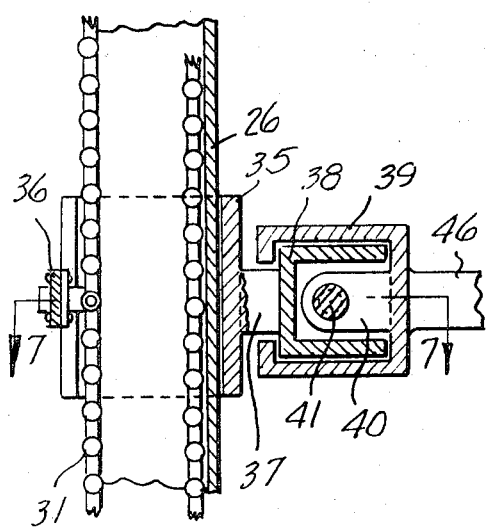
FIG. 6 is an enlarged fragmentary transverse vertical cross-sectional view taken substantially on the line 6—6 of FIG. 4.
Figure 7:
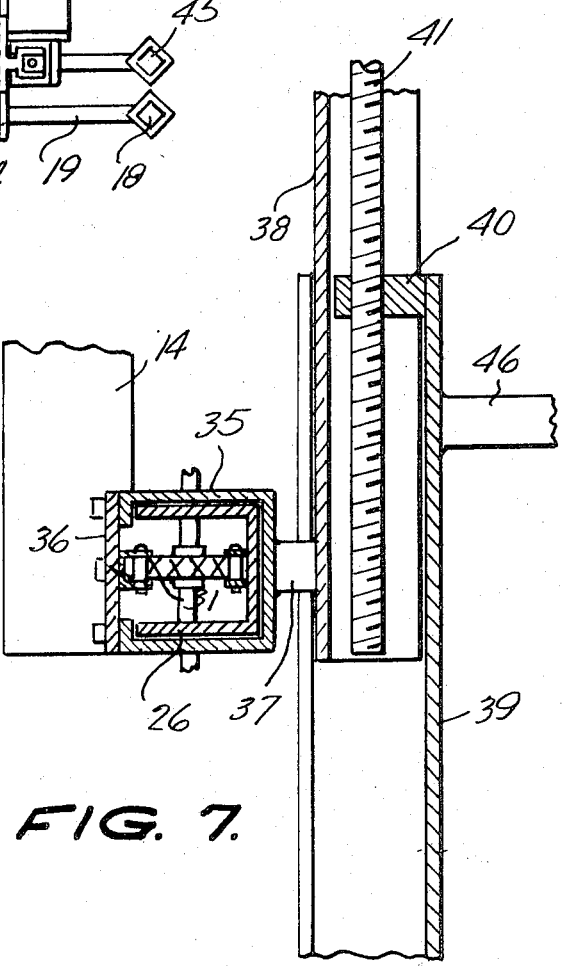
FIG. 7 is a fragmentary horizontal cross-sectional view taken substantially on the line 7—7 of FIG. 6.

Embracing and slidably engaged on the post members 25, 26 are respective pairs of generally C-shaped sleeve members 34, 35 provided with outer cross bars 36 which are respectively connected to the adjacent portions of the sprocket chains 31 in the manner shown in FIG. 6 whereby the sleeve members 34, 35 are simultaneously elevated or lowered responsive to the rotation of their associated drive shafts 28, with the direction of movement of the members 34,35 depending upon the direction of rotation of said drive shafts.

Rigidly secured to each pair of C-shaped members 34,35 by connecting arms 37,37 is transversely extending horizontal channel bar 38, each channel bar 38 being telescopically engaged with an outer generally C-shaped bar member 39 in the manner shown in FIG. 6. Each bar member 39 is provided at its inner end with a transversely extending nut portion 40 which is threadedly engaged by a threaded driving shaft 41 journaled at its inner end portion at the inner end portion of the associated channel member 38, as shown at 42. The inner end of each shaft 41 is drivingly connected through suitable reduction gearing 43 to a respective hydraulic motor 44, the motor 44 and reduction gearing 43 being suitably mounted on and rigidly secured to a supporting plate 45 rigidly secured to the inner end portion of the associated channel member 38. Thus, the members 39 may be extended or retracted relative to their associated channel members 38 responsive to the operation of their associated hydraulic motors 44, the direction of movement of the members 39 depending upon the direction of rotation of their associated drive screws 41.

Secured to each C-shaped extensible member 39 is an auxiliary tool bar 45, the tool bars 45 being connected to their associated supporting sleeve members 39 by spaced longitudinally extending arms 46, as shown in FIG. 4. The tool bars 45,45 are thereby supported substantially in the same transverse vertical plane as the fixed main tool bar 18. Secured to and depending from each auxiliary tool bar 45 are a plurality of depending additional planters 23, for example, two additional planters 23 are provided on each auxiliary tool bar 45, spaced on opposite sides of an auxiliary swiveled caster assembly 46, similar to the previously mentioned caster assemblies 20 provided for the main tool bar 18.

The respective hydraulic motors 44,44 and 30,30 are driven from the hydraulic power take-off outlet of the tractor through suitable conduit connections including control valves contained in a control box 47 mounted on the intermediate portion of the top transverse frame bar 27, the control box 47 being provided with drive control levers 48 for operating the respective hydraulic motors. The control box 47 is easily accessible from the driver seat of the tractor so that the levers 48 may be operated by the driver substantially without requiring him to move from his normal operating position and without requiring him to descend from the tractor.

Figure 2:
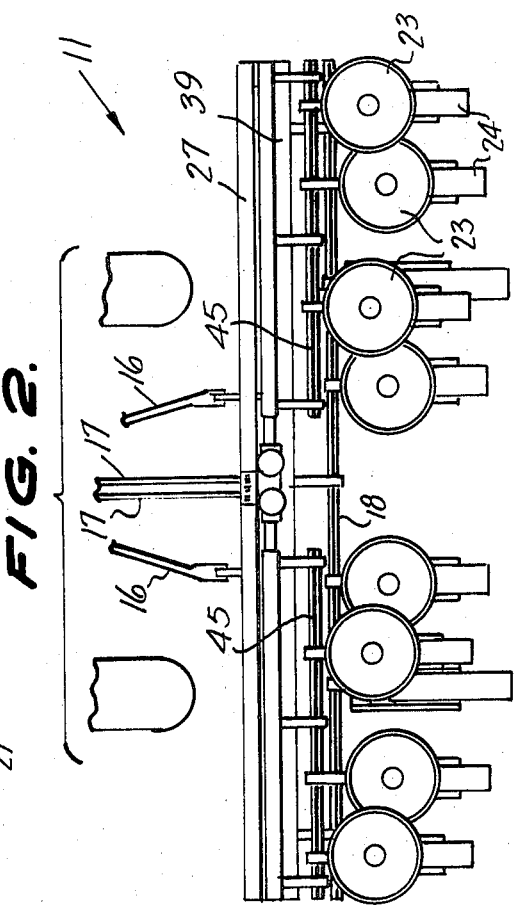
FIG. 2 is a fragmentary top plan view, generally similar to that shown in FIG. 1, but showing the attachment with the outer parts thereof in retracted inoperative positions, whereby the width of the attachment is substantially reduced, as compared with the condition illustrated in FIG. 1.
Figure 5:
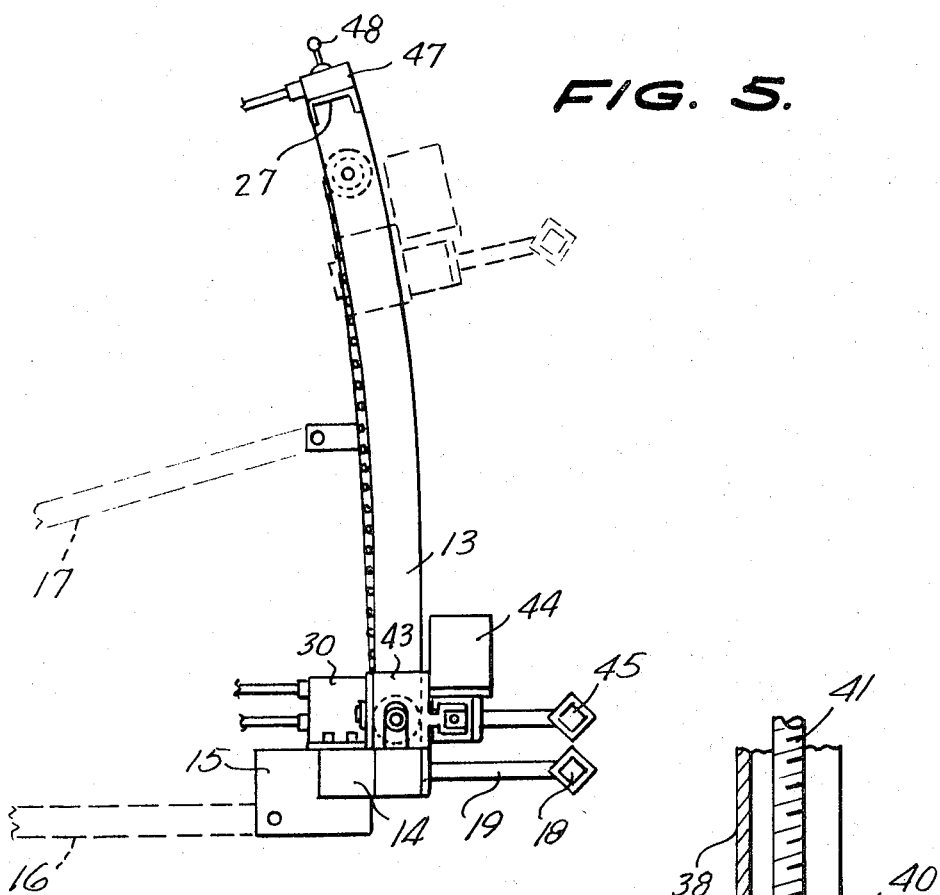
FIG. 5 is a transverse vertical cross-sectional view taken substantially on the line 5—5 of FIG. 3.

FIG. 1 illustrates the normal positions of the parts when the tractor and the attachment are operating in a normal manner over an area being worked. When the necessity arises for retracting the outer parts of the attachment, for example, when it is necessary to make a sharp turn at the end of a row or when it is necessary to pass through a relatively restricted passageway such as to pass over a narrow bridge with railings or to pass through a narrow gate opening, the operator first energizes the hydraulic motors 30,30 by using the appropriate levers 48 in a manner to elevate the auxiliary tool bars 45,45, for example, to raise them to the dotted view position thereof shown in FIG. 5. This elevation is to a height sufficient to allow the outer planters 23,23 and caster assemblies 46 to clear the main tool bar 18 when the outer elements are retracted. After the tool bar 45 has been thus elevated to a sufficient height, energization of the hydraulic motors 30 is discontinued and the operator actuates the control levers 48 to energize the hydraulic motors 44,44 in a direction to retract the sleeve members 39 by the action of the screw shafts 41. The sleeve members 39 and parts carried thereby including the tool bars 45 and the equipment suspended therefrom are then retracted inwardly by the action of the drive screws 41, moving said parts to positions overlying the main tool bar 18, at which time the operator terminates operation of the hydraulic motors 44. Thereafter, the operator reenergizes the motors 30 to allow the auxiliary tool bars 45 to descend, causing the parts to reach the positions thereof shown in FIG. 2. In this configuration, the attachment has been substantially reduced in width and the necessary maneuvers can be made. After these maneuvers have been completed, the parts may be restored to their original positions shown in FIG. 1, as so desired, by reversing the above-described procedure.

As above mentioned, various other types of implements may be mounted on the tool bars 18 and 45 other than the planters 23 shown in the drawings, for example, the tool bars may carry cultivators, ridgehippers, bedders, or other types of agricultural implements.

While a specific embodiment of an improved retractable tool-carrying attachment for a tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tool-carrying attachment for a tractor comprising transversely extending upstanding frame means, means to connect said frame means to a tractor, a main tool bar, means rigidly securing said main tool bar in parallel relation to said upstanding frame means, transversely extending guide means movably connected to said upstanding frame means, said guide means extending substantially parallel to said main tool bar, means mounted on said frame means to selectively raise and lower said transversely extending guide means on said upstanding frame means, a transversely extending support member engaged with said guide means and having means for constraining said support member to move parallel to said main tool bar, a transversely extending auxiliary tool bar rigidly secured to said support member, and means connected to said guide means to selectively move said support member in either direction along said guide means.

2. The tool-carrying attachment of claim 1, and ground-engaging support means secured to and depending from said main tool bar and said auxiliary tool bar.

3. The tool-carrying attachment of claim 2, and wherein the means to selectively raise and lower said transversely extending guide means comprises upstanding endless flexible belt means mounted on said upstanding frame means, motor means on said upstanding frame means drivingly connected to said belt means, and means supportingly connecting said guide means to said belt means.

4. The tool-carrying attachment of claim 3, and wherein said frame means includes a pair of spaced upstanding channel members and said belt means comprises respective endless belt members mounted in said upstanding channel members.

5. The tool-carrying attachment of claim 4, and wherein the means supportingly connecting the guide means to the belt means comprises sleeve members slidably engaged on said channel members, means connecting said sleeve members to the respective endless belt members, and means connecting said sleeve members to the guide means.

6. The tool-carrying attachment of claim 5, and wherein said guide means comprises a transversely extending inner channel member and said support member comprises an outer channel member telescopically and slidably engaged on said inner channel member, and wherein the means to move the support member along said guide means comprises a drive screw journaled to and contained in said inner channel member and nut means on said outer channel member threadedly engaged by said drive screw.

7. The tool-carrying attachment of claim 6, and reversible motor means on said inner channel member drivingly connected to said drive screw.

8. The tool-carrying attachment of claim 7, and wherein said last-named reversible motor means comprises a hydraulic motor.

9. The tool-carrying attachment of claim 8, and wherein the motor means drivingly connected to the belt means comprises a reversible hydraulic motor.

10. The tool-carrying attachment of claim 9, and control valve means on the top portion of said upstanding frame means operatively connected to said reversible hydraulic motors.

* * * * *